United States Patent Office 3,370,963
Patented Feb. 27, 1968

3,370,963
GROWTH OF DIVALENT METAL ALUMINATES
William A. Bonner, Scotch Plains, and Le Grand G. Van Uitert, Morris Township, Morris County, N.J., assignors to Bell Telephone Laboratories, Incorporated, New York, N.Y., a corporation of New York
No Drawing. Filed Mar. 24, 1965, Ser. No. 442,510
8 Claims. (Cl. 106—42)

ABSTRACT OF THE DISCLOSURE

Single crystal divalent metal aluminates may be grown from a flux initially comprising a mixture of lead oxide, lead fluoride, and silicon dioxide, or mixtures thereof with boron oxide.

---

This invention relates to a method for the growth of single crystal divalent metal aluminates from a flux initially comprising lead fluoride, lead oxide and silicon oxide.

The metal aluminates of interest herein may be represented by the general formula $$MAl_2O_4$$

wherein M is a divalent metal selected from among beryllium, zinc and magnesium, Al is aluminum and O is oxygen.

Heretofore, the magnesium compositions have typically been prepared by conventional flame fusion technniques. Unfortunately, such techniques have not proven satisfactory for the zinc or beryllium compositions. For example, significant health hazards are posed with beryllium, sublimation problems occur with zinc, et cetera, so promoting workers in the art to seek a superior alternative. Various attempts to grow the compositions of interest from diverse fluxes were unsatisfactory, and it was determined that at most one could obtain small crystals in negligible yields from a lead fluoride flux.

In accordance with the present invention, a technique for preparing divalent metal aluminates is described wherein the constituent components of the desired aluminate are combined with a flux initially comprising lead fluoride, lead oxide and silicon oxide or mixtures thereof with boron oxide, the mixture heated to form a homogeneous liquid and the single crystalline material formed from the molten bath by convenient crystallization procedures.

The resultant aluminates are colorless, transparent and, in the cases of $ZnAl_2O_4$ and $BeAl_2O_4$, of magnitude superior to those grown by conventional techniques. The compositions typically evidence a refractive index of approximately 1.78 and a hardness of 7 on the Mohs scale, so suggesting their use in the preparation of synthetic gemstones. Further, the addition of small quantities of transition metal ions, such as chromium, cobalt, nickel, manganese, et cetera, imparts attractive characteristic colors to the described aluminates.

An important aspect of the present invention lies in the use of specific flux compositions, for example, those containing critical mole percentages of lead fluoride, lead oxide, silicon oxide and boron oxide.

In the growth of the described compositions, it is essential that the mole percent, based on the entire composition, of lead fluoride range from 15 to 70, the mole percent of lead oxide range from 15 to 50, the mole percent of silicon oxide range from 5 to 30 and the mole percent of boron oxide range from 0 to 10. An optimum has been found to correspond with 40.6 mole percent lead fluoride, 34.4 mole percent lead oxide, 18.8 mole percent silicon oxide and 6.22 percent boron oxide.

It has also been determined that growth of the desired aluminates will not occur unless the mole ratio of lead oxide to silicon oxide range from 1.66:1 to 3:1. The use of $PbO/SiO_2$ ratios less than the noted minimum tend toward excessive supersaturation which may lead to dendritic growth, flux entrapment and poor yields. On the other hand, the use of $PbO/SiO_2$ ratios greater than the noted maximum results in an increased incidence of sapphire since the lead oxide effectively ties up the divalent metal ion of interest.

Studies on the growth of aluminates with various flux component ratios have extended down to boron oxide mole percentages of zero at which there is generally some decrease in the perfection and yield of the desired crystal, so dictating a preference for the use of small quantities at least of the order of one percent of boron oxide.

The procedure for crystallization of the aluminates in accordance with the present invention employs 1350° C. as the upper limit of temperature. This limitation is set by reason of considerations pertaining to volatility of ingredients in the melt, changing composition of the flux, as well as by reactions with crucible materials, such as platinum, at temperatures substantially in excess of this limit and for various practical reasons such as apparatus limitations. The lower temperature limit of the system during crystallization in the aluminate system is in the neighborhood of 700° C. and is determined by the solidification of the flux. Thereafter, the resultant composition may be cooled to room temperature and the flux removed by washing with acid.

Optimum cooling rates over the crystallization range of from about 1300 to 700° C. are determined by the usual criteria, the faster the rate of cooling, the greater the number of nucleation centers with a consequent decrease in crystal size and vice versa. Cooling rates may vary from as low as ⅛° C. per hour or lower to as high as 3° C. per hour. It is generally desirable to cool as slowly as possible to secure the largest possible crystal size and yet complete the growth within a reasonable time. Consequently, a cooling rate between ½ and 2° C. per hour is generally most desirable.

For the fluxes described, it is desirable to operate at the approximate nutrient to flux weight ratios within the range of 1:2.3 to 1:15. Operation with the lesser nutrient concentration (1:15) results in the initiation of nucleation at a considerably lower temperature and results in an overall decrease in the temperature range of crystallization with a resultant decrease in crystal size. Operation of the process at a more concentrated ratio (1:2.3) results in an increase in the number of nucleation centers for a given cooling rate with a consequent loss in control. As noted above, the formula for the aluminates described is $MAl_2O_4$, so indicating an atomic ratio of 1 part M to 2 parts Al. Operation of the process with the ratio indicated by the stoichiometric proportions has been found effective; however, it has been found helpful to employ and excess of aluminum oxide beyond stoichiometry. Nevertheless, the case of beryllium and zinc aluminates, it is permissable to employ amounts ranging from twothirds of the stoichiometric amount of excesses of 100 percent beyond stoichiometry.

For applications where one is interested in adding small amounts of transition metal ions, for example, for the purpose of obtaining a synthetic gemstone, all of the above considerations apply. Thus, where it is desirable to produce aluminates of the colors set forth below in Table I and the crystal components constitute, for example, about 10 wt. percent of the melt, the noted amounts of transition metal ion should be added.

cumstances, this cleaning procedure at room temperature takes several days dependent on the amount of flux and size of the charge. It has been found expeditious to carry out the acid cleaning at temperatures approximating the boiling point of the acid solution. Subsequent to this, the acid solution was poured off, the crucible removed from the container and the crystals washed in water. Following the water washing, the crystals were dried by air drying at room temperature. The resultant crystals were then weighed and chemically analyzed.

TABLE II

| Example | Starting Ingredients (Grams) | | Grams | | | | Product | Yield (Grams) | Octahedron Edge Dimension, Inch |
|---|---|---|---|---|---|---|---|---|---|
| | | | PbO | PbF$_2$ | SiO$_2$ | B$_2$O$_3$ | | | |
| 1 | ZnO | 12.2 | 129.6 | 158.4 | 18.0 | 6.7 | ZnAl$_2$O$_4$ | 16.7 | ¼ |
| | Al$_2$O$_3$ | 20.4 | | | | | | | |
| 2. MnO | ZnO | 17.2 | 129.8 | 158.7 | 18.0 | 7.2 | ZnAl$_2$O$_4$ | 19.0 | ¼ |
| | Al$_2$O$_3$ | 70.4 | | | | | | | |
| | Mn$^{++}$ | .01 | | | | | | | |
| 3. NiO | ZnO | 17.2 | 129.8 | 158.7 | 18.0 | 7.2 | ZnAl$_2$O$_4$ | 18.4 | ¼ |
| | Al$_2$O$_3$ | 70.4 | | | | | | | |
| | Ni$^{++}$ | .01 | | | | | | | |
| 4. Co$_2$O$_3$ | ZnO | 17.2 | 129.8 | 158.7 | 18.0 | 7.2 | ZnAl$_2$O$_4$ | 70.1 | ¼ |
| | Al$_2$O$_3$ | 20.4 | | | | | | | |
| | Co$^{++}$ | .001 | | | | | | | |
| 5. Cr$_2$O$_3$ | ZnO | 122.1 | 1,299.7 | 1,588.5 | 180.2 | 77.2 | ZnAl$_2$O$_4$ | 170.0 | ½ |
| | Al$_2$O$_3$ | 203.9 | | | | | | | |
| | Cr$^{++}$ | .57 | | | | | | | |
| 6. Cr$_2$O$_3$ | BeO | 3.8 | 108.2 | 132.2 | 18.0 | 6.0 | BeAl$_2$O$_4$ | 5.3 | 1 ¾ [1] |
| | Al$_2$O$_3$ | 20.4 | | | | | | | |
| | Cr$_2$O$_3$ | .005 | | | | | | | |

[1] Longest dimension.

TABLE I

| Example | Transition Metal Ion | Atoms of Coloring Agent per atom of Be or Zn | Color |
|---|---|---|---|
| 1 | Cr$^{+++}$ | .003–.03 | Pink. |
| 2 | Cr$^{+++}$ | .03–.3 | Red. |
| 3 | Mn$^{++}$ | .001–0.05 | Yellow. |
| 4 | Ni$^{++}$ | .0003–.003 | Pale Blue |
| 5 | Ni$^{++}$ | .003–.03 | Blue-Green. |
| 6 | Co$^{++}$ | .0002–.003 | Light Blue. |
| 7 | Co$^{++}$ | .003–.03 | Dark Blue. |

Examples of the application of the present invention are set forth below. They are intended merely as illustration and it is to be appreciated that the processes described may be varied by one skilled in the art without departing from the spirit and scope of the present invention.

The examples are in tabular form for convenience and brevity. Each set of data in Table II is to be considered as a separate example since each set of data was obtained in a separate process. The procedure followed in each of the examples is as follows.

A mixture of the starting materials was weighed into a platinum crucible and sealed with a platinum lid. The crucible was next placed in a "Globar" furnace which had been preheated to 1000° C. and the crucible, together with its contents, was then permitted to attain a temperature of 1300° C. and maintained thereat for a time interval ranging from 0 to 24 hours.

Controlled cooling at the rate of ½° C. per hour from the maximum of 1300° C. and then initiated by a controlled energization of the furnace. This program was continued until a temperature of approximately 800° C. was reached. At this point, the furnace was shut off and the resultant composition allowed to cool to the ambient temperature.

The cooled crucible was then immersed in a vessel containing a dilute solution of nitric acid and water. The acid cleaning procedure was continued until all flux residue was removed from the crystals. Under ordinary cir-

What is claimed is:

1. A method for the growth of a compound represented by the general formula MAl$_2$O$_4$ wherein M is a divalent metal selected from the group consisting of zinc, beryllium and magnesium, Al is aluminum and O is oxygen which comprises the steps of heating the constituent components of said compound together with a flux comprising from 15–70 mole percent PbF$_2$, 15–50 mole percent PbO, 5–30 mole percent SiO$_2$, and 0–10 mole percent B$_2$O$_3$, to a temperature of approximately 1300° C., the mole ratio of PbO to SiO$_2$ ranging from 1.66:1 to 3:1, the gross nutrient to flux ratio ranging from 1:2.3 to 1:15 and slowly cooling the resultant melt whereby said compound precipitates from the melt in crystals.

2. A method in accordance with the procedure of claim 1 wherein said melt comprises ZnO, Al$_2$O$_3$, PbO, PbF$_2$, SiO$_2$ and B$_2$O$_3$.

3. A method in accordance with the procedure of claim 1 wherein said melt comprises BeO, Al$_2$O$_3$, PbO, PbF$_2$, SiO$_2$ and B$_2$O$_3$.

4. A method in accordance with the procedure of claim 1 wherein the mole percent of the constituent components of said flux are PbF$_2$ ---------------------------------- 40.6
PbO ----------------------------------- 34.4
B$_2$O$_3$ ---------------------------------- 6.2
SiO$_2$ ---------------------------------- 18.8

5. A method in accordance with the procedure of claim 2 wherein said melt includes Cr$_2$O$_3$ the number of atoms of Cr$^{+++}$ in the melt ranging from 0.003–0.3.

6. A method in accordance with the procedure of claim 2 wherein said melt includes NiO the number of atoms of Ni$^{++}$ in the melt ranging from 0.0003–0.03.

7. A method in accordance with the procedure of claim 2 wherein said melt includes CoO the number of atoms of Co$^{++}$ in the melt ranging from 0.0002–0.03.

8. A method in accordance with the procedure of claim 3 wherein said melt comprises Cr$_2$O$_3$ the number of atoms of Cr$^{+++}$ in the melt ranging from 0.003–0.3.

(References on following page)

References Cited

UNITED STATES PATENTS

| | | | |
|---|---|---|---|
| 2,848,310 | 8/1958 | Remeika | 23—51 X |
| 3,050,407 | 8/1962 | Nielsen | 23—51 X |
| 3,063,886 | 11/1962 | Remeika | 23—51 X |
| 3,079,240 | 2/1963 | Remeika | 23—51 X |

OTHER REFERENCES

Carter, "Journal of The American Ceramic Soc.," vol. 44, No. 3, March 1961, pp. 116–120.

OSCAR R. VERTIZ, *Primary Examiner.*

H. T. CARTER, *Assistant Examiner.*